(12) United States Patent
Li et al.

(10) Patent No.: US 10,479,190 B2
(45) Date of Patent: Nov. 19, 2019

(54) ELECTRIC WHEEL HUB AND DRIVING WHEEL

(71) Applicant: ZHEJIANG LINIX MOTOR CO., LTD., Dongyang, Zhejiang Province (CN)

(72) Inventors: Yuan Li, Dongyang (CN); Jianliang Ge, Dongyang (CN)

(73) Assignee: ZHEJIANG LINIX MOTOR CO., LTD., Dongyang (CN)

( * ) Notice: Subject to any disclaimer, the term of this patent is extended or adjusted under 35 U.S.C. 154(b) by 48 days.

(21) Appl. No.: 15/745,045

(22) PCT Filed: May 25, 2017

(86) PCT No.: PCT/CN2017/085831
§ 371 (c)(1),
(2) Date: Jan. 15, 2018

(87) PCT Pub. No.: WO2017/202353
PCT Pub. Date: Nov. 30, 2017

(65) Prior Publication Data
US 2018/0201119 A1     Jul. 19, 2018

(30) Foreign Application Priority Data

May 27, 2016  (CN) .......................... 2016 1 0359460

(51) Int. Cl.
| | | |
|---|---|---|
| *B60K 7/00* | (2006.01) | |
| *B60K 17/04* | (2006.01) | |
| *B60T 13/74* | (2006.01) | |
| *H02K 7/102* | (2006.01) | |
| *H02K 7/116* | (2006.01) | |
| *H02K 7/14* | (2006.01) | |
| *F16D 63/00* | (2006.01) | |

(52) U.S. Cl.
CPC .............. *B60K 7/0007* (2013.01); *B60K 7/00* (2013.01); *B60K 17/046* (2013.01); *B60T 13/748* (2013.01); *F16D 63/002* (2013.01); *H02K 7/1023* (2013.01); *H02K 7/116* (2013.01); *H02K 7/14* (2013.01); *B60K 2007/0038* (2013.01); *B60K 2007/0092* (2013.01)

(58) Field of Classification Search
CPC ........ B60K 7/00; B60K 7/007; B60K 17/046; B60K 2007/0038; B60K 2007/0092; B60Y 13/748; F16D 62/002; H02K 7/12; H02K 7/116; H02K 7/1023
See application file for complete search history.

(56) References Cited

U.S. PATENT DOCUMENTS 6,661,137 B2 * 12/2003 Gauthier .............. B60K 7/0007
310/156.01

* cited by examiner

*Primary Examiner* — Bryan A Evans
(74) *Attorney, Agent, or Firm* — Jiwen Chen

(57) ABSTRACT

An electric wheel hub, comprising a wheel hub (1) and an inner ring gear (2). The inner ring gear and the wheel hub are fixed coaxially and rotate synchronously. A drive motor is provided within an inner cavity of the wheel hub. A motor shaft of the drive motor has one end fitting to the inner ring gear via a planetary reduction mechanism, and the other end provided with an electromagnetic braking mechanism. The wheel hub of the present invention has advantages of reducing the weight of a drive wheel, lowering manufacturing costs, etc. Also disclosed is a drive wheel.

8 Claims, 6 Drawing Sheets

ELECTRIC WHEEL HUB AND DRIVING WHEEL

This is a U.S. national stage application of PCT Application No. PCT/CN2017/085831 under 35 U.S.C. 371, filed May 25, 2017 in Chinese, claiming priority of Chinese Application No. 201610359460.2, filed May 27, 2016, all of which are hereby incorporated by reference.

TECHNICAL FIELD OF THE INVENTION

The present invention relates to an electric hub and a driving wheel using the electric hub.

BACKGROUND OF THE INVENTION

Senior people often use electrically powered wheelchairs and scooters designed especially for the seniors. However, due to their heavy weight, the existing electrically powered wheelchairs and scooters designed especially for the seniors are strenuous for the seniors to move. To enable the seniors to easily move the wheelchairs or scooters designed especially for the seniors, the electrically powered wheelchairs and the scooters designed especially for the seniors should be light and portable. In an existing electrically powered wheelchair or a scooter designed especially for the seniors, a hub is rotated by a motor and a speed reduction mechanism. A motor shaft of the motor is linked with a planet gear of the speed reduction mechanism, the planet gear of the speed reduction mechanism is meshed with an inner gear ring of the hub, and the hub is driven to rotate by the rotation of the planet gear. In order to ensure the strength of the inner gear ring of the hub, the inner gear ring is usually made of steel. Since the inner gear ring is integrated with the hub, the hub is also to be made of steel rather than lightweight aluminum alloy material. As a result, the hub is heavy. Moreover, since a tire will often rotate relative to the hub, the existing electrically powered wheelchair or scooter designed especially for the seniors will run a certain distance after it is braked, or result in other accidents.

SUMMARY OF THE INVENTION

An object of the present invention is to provide an electric hub having a compact structure and a light weight.

For this purpose, the present invention employs the following technical solutions. An electric hub is provided, including a hub and an inner gear ring, wherein the inner gear ring and the hub are separated from each other, and the inner gear ring and the hub are fixed coaxially and rotate synchronously; the hub has a hollow inner chamber within which a driving motor is provided; the driving motor includes a housing and a motor shaft; there is a gap between an outer wall of the housing and an inner wall of the inner chamber of the hub; and, one end of the motor shaft is matched with the inner gear ring via a planet speed-reduction mechanism, while an electromagnetic brake mechanism is provided at the other end of the motor shaft.

Since the hub and the inner gear ring in the present invention are separated from each other, the hub and the inner gear ring are unnecessarily made of the same material. It is possible that the inner gear ring is made of steel and the hub is made of aluminum, so that the weight of the hub of the present invention is decreased. The motor shaft of the driving motor drives a sun gear of the planet speed-reduction mechanism to rotate, so as to rotate a planet gear meshed with the sun gear. Since the planet gear is meshed with the inner gear ring, the rotation of the planet gear may drive the rotation of the inner gear ring so as to realize the rotation of the hub. Since the braking effect acts on the motor shaft, the brake mechanism of the present invention can brake the motor shaft at a small force, so that a brake mechanism applying a small force may be selected and the production cost is thus reduced, or, without replacing the brake mechanism, the motor shaft can be braked in an even better fashion, so that the braking is more stable and the braking strength is thus improved. Since the driving motor is disposed within the hub, the structure of the present invention may become more compact.

Preferably, a left hub end cover and a right hub end cover are fitted at two ends of the inner chamber of the hub, respectively; the planet speed-reduction mechanism includes a planet carrier; and, the planet carrier is fixed to one end of an electric hub mounting shaft, while the other end of the electric hub mounting shaft extends outside the right hub end cover.

Preferably, the driving motor includes a rear motor end cover and a front motor end cover; a cylindrical bearing chamber is formed by the rear motor end cover; the cylindrical bearing chamber extends outside the left hub end cover and is fixed to the electric hub mounting plate; and, the planet carrier is fixed to the front motor end cover. When the hub is rotated, the planet carrier and the housing of the motor are kept fixed relative to a vehicle frame. With the arrangement, the electric hub of the present invention may be compact in structure and small in size.

Preferably, a number of bosses extending inward are formed on an inner wall of the hub, a number of fixed portions extending outward are formed on an outer edge of the inner gear ring, and fixed portion grooves matched with the fixed portions in shape are formed on the bosses; inner walls of the bosses are first cambered surfaces fitted with the outer edge of the inner gear ring; the fixed portions of the inner gear ring are located within the fixed portion grooves; and, the fixed portions of the inner gear ring are fixed to the hub via fasteners, and the outer edge of the inner gear ring is resisted against the inner walls of the bosses.

The arrangement of the fixed portion grooves is convenient to position and fix the fixed portions of the inner gear ring and the hub, and the first chambered surfaces may keep the position of the fixed inner gear ring in the circumferential direction. Process holes corresponding to each other may be formed on the fixed portion grooves and the fixed portions, and the fixed portions of the inner gear ring may be fixed to the bosses via fasteners such as screws. The thickness of the fixed portions of the inner gear ring may be less than that of the inner gear ring, so that the amount of material for casting is reduced.

Preferably, at least three fixed portions extending outward are formed on the outer edge of the inner gear ring, and the fixed portions are arranged annularly at uniform intervals; the bosses include first bosses and second bosses, and there are at least three first bosses; the fixed portion grooves are arranged on the first bosses, and the fixed portions are in one-to-one correspondence to the first bosses; the fixed portions of the inner gear ring are fixed to the fixed bosses via fasteners; and, the first chambered surfaces are formed on both the inner walls of the first bosses and the inner walls of the second bosses. The number of the fixed portions is equal to the number of the first bosses, and the number of the fixed portions is greater than or equal to 3. It is more stable than the case where only two fixed portions are formed. It is possible to simply provide three fixed portions. Accordingly, the casting cost of the inner gear ring is decreased, the fixation stability of the inner gear ring and the hub can be ensured, and both the weight and the assembly time can be reduced. When the hub and the inner gear ring are large in size, a plurality of second bosses may be provided. Thus, by decreasing the size and number of the first bosses, the limiting and fixation of the inner gear ring in the circumferential direction is ensured.

Preferably, the electromagnetic brake mechanism includes a brake block located on the motor shaft and a brake pad which is sheathed outside the brake block and fixed with the brake block; the brake block is of a polygonal structure, the brake pad is disc-shaped, and a fitting groove matched with the brake block in shape is formed in the center of the brake pad; and, a brake arm capable of locking the brake pad is provided outside the hub. Since both the brake block and the brake pad are arranged on the motor shaft, the brake arm of the present invention can lock the brake pad fixed to the motor shaft at a smaller force so as to realize a braking action, so that a brake mechanism applying a small force may be selected and the production cost is thus reduced; or, without replacing the brake, the braking operation can be performed well, so that the braking is more stable and the braking strength is improved. The brake block of a polygonal structure can ensure the relative fixation to the brake pad.

Preferably, a lead clamp is fixed on the electric hub mounting plate; a first groove section and a second groove section are provided at a position on the electric hub mounting plate corresponding to an outer side of the lead clamp; a leading-out wire of the motor is fitted with the lead clamp, and a spring sheath is sheathed outside the leading-out wire; the spring sheath comprises a first section and a second section; the diameter of the first section is greater than that of the second section, and the diameter of the second section is matched with the diameter of the leading-out wire; the first section is fixed within the first groove section, and the second section is fixed within the second groove section; and, the leading-out wire passes through the lead clamp and then successively through the first groove section and the second groove section; the lead clamp includes an upper clamp body and a lower clamp body, both of which are of an ohm-type structure; an opening of the upper clamp body and an opening of the lower clamp body are arranged opposite to each other; the leading-out wire is fitted between the upper clamp body and the lower clamp body; and, meshing teeth are formed inside both the opening of the upper clamp body and the opening of the lower clamp body.

The spring sheath can protect the exposed portion of the leading-out wire, and can prevent the leading-out wire from scratching, water ingress and aging. The spring sheath can be bent together with the leading-out wire. The length of the spring sheath in the present invention should be consistent with the length of the exposed portion of the leading-out wire, so that the leading-out wire is better protected. To protect the leading-out wire from scratching, the pitch of the spring should be small. One end of the spring sheath is fixed within the first groove section and the second groove section, while the other end thereof can be fixed to a frame of a wheelchair or of a scooter. The width and depth of each of the first groove section and the second groove section can be designed in such a way that the first section of the spring sheath can be clamped within the first groove section and the second section of the spring sheath can be clamped within the second groove section. The lead clamp is used for guiding and fixing the leading-out wire, the arrangement of the meshing teeth of the upper clamp body and the lower clamp body is convenient to fix the leading-out wire, and it is convenient to pass the leading-out wire through the first groove section and the second groove section.

Preferably, at least six first process holes are formed at an end of the inner chamber of the hub equipped with the left hub end cover, and at least six second process holes are formed at an end of the inner chamber of the hub equipped with the right hub end cover; both the first process holes and the second process holes are arranged annularly at uniform intervals; each of the second process holes is relatively located between two bosses; and, the bosses extend outward along an axis of the hub; second chambered surfaces matched with an inner wall of the right hub end cover are formed on the outer walls of the bosses, and the second chambered surfaces are of a slope structure inclined to the inner side.

Both the left hub end cover and the right hub end cover are used for protecting the structure inside the hub, and both the left hub end cover and the right hub end cover are fixed to the hub via at least six fasteners, so that the stability is higher. Since each of the second process holes is relatively located between two bosses, the bosses abdicate the process holes of the right hub end cover, so that it is convenient to position the right hub end cover. The arrangement of the second chambered surfaces is convenient to fix the right hub end cover.

The present invention further discloses a driving wheel equipped with the electric hub.

For this purpose, a number of ribs protruded outward are formed on the outer wall of the hub, the ribs are parallel to the axis of the hub, and the ribs are distributed at uniform intervals on the outer wall of the hub in a circumferential direction of the hub. A tire can be directly cast on the hub, or a tire can be sheathed outside the hub. Since the ribs are provided on the outer wall of the hub of the present invention and the ribs are arranged along the axis of the hub, the fixation of the tire in the circumferential direction can be ensured. When the hub stops rotating, the tire will be subjected to the resistance from the ribs to avoid the idling and slipping of the tire relative to the hub, so that the safety of the driving wheel of the present invention is improved. In order to prevent the axial disengagement of the tire from the hub, flanges should be provided on two opposite sides of the hub.

Preferably, a tire is provided outside the hub; a number of fitting grooves in one-to-one correspondence to the ribs are formed on an inner side of the tire; the width of each of the fitting grooves gradually increases from the bottom to the opening; each of the ribs has a square cross-section; and the tire is a solid foam tire. When the tire is sheathed outside the hub, a portion of the tire corresponding to the bottom of a fitting groove will be expanded by the ribs, so that the compactness of the tire and the hub can be improved.

The present invention has the advantages of decreased weight of the driving wheel and reduced production cost. With the present invention, the slipping of the tire relative to the hub can be avoided, and the braking performance of the driving wheel is better. The present invention is high in safety and compact in structure. Moreover, a wheelchair or scooter using the driving wheel of the present invention may be smaller in size and lighter in weight.

DETAILED DESCRIPTION OF THE INVENTION

Figure 1:
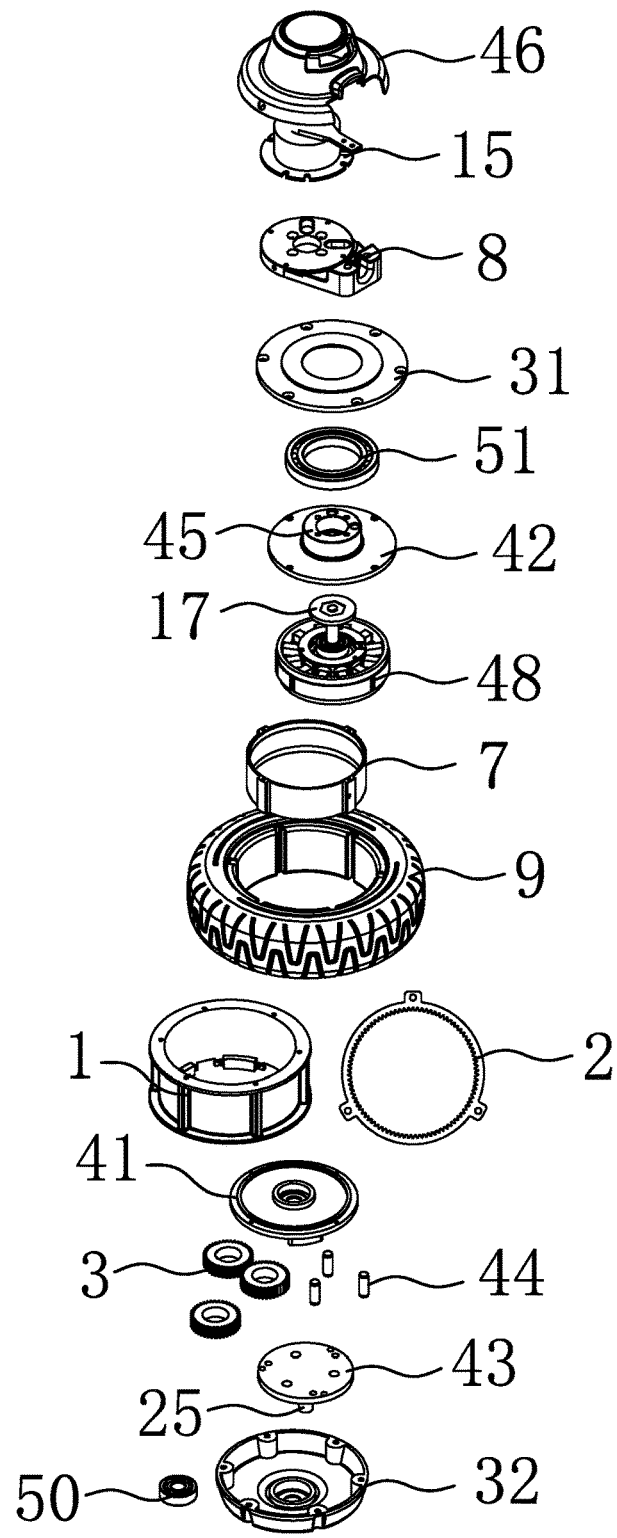
FIG. 1 is an exploded view of the present invention.

As shown in FIGS. 1, 2, 4, 6 and 7, the present invention provides an electric hub, including a hub 1 and an inner gear ring 2. The inner gear ring 2 and the hub 1 are separated from each other, and the inner gear ring 2 and the hub 1 are fixed coaxially and can rotate synchronously. The hub 1 has a hollow inner chamber within which a driving motor is provided. The driving motor includes a housing 7, a stator 48 and a motor shaft 6. There is a gap between an outer wall of the housing and an inner wall of the inner chamber of the hub. One end of the motor shaft 6 is matched with the inner gear ring 2 via a planet speed-reduction mechanism, while an electromagnetic brake mechanism is provided at the other end of the motor shaft 6. A planet gear 3 of the planet speed-reduction mechanism is meshed with the inner gear ring 2, and the rotation of the motor shaft 6 of the motor can drive the rotation of the inner gear ring 2 meshed with the planet gear 3 so as to rotate the hub 1 fixed to the inner gear ring 2.

As shown in FIGS. 1, 4, 6 and 7, six bosses extending inward are formed on the inner wall of the hub 1, three fixed portions 11 extending outward are formed on an outer edge of the inner gear ring 2, and fixed portion grooves 12 matched with the fixed portions 11 in shape are formed on the bosses. The three fixed portions 11 are arranged annularly at uniform intervals. The bosses include three first bosses 4 and three second bosses 5. The fixed portion grooves 12 are arranged on the first bosses 4, and the fixed portions 11 are in one-to-one correspondence to the fixed portion grooves 12. First chambered surfaces 13 fitted with the outer edge of the inner gear ring 2 are formed on both the inner walls of the first bosses 4 and the inner walls of the second bosses 5. The six bosses are arranged annularly at uniform intervals, each of the first bosses 4 is located between two second bosses 5, and each of the second bosses 5 is located between two first bosses 4. The fixed portions 11 of the inner gear ring 2 are located within the fixed portion grooves 12, and the fixed portions 11 are fixed to the first bosses 4 via fasteners. The outer edge of the inner gear ring 2 is resisted against the inner walls of the bosses.

Figure 4:
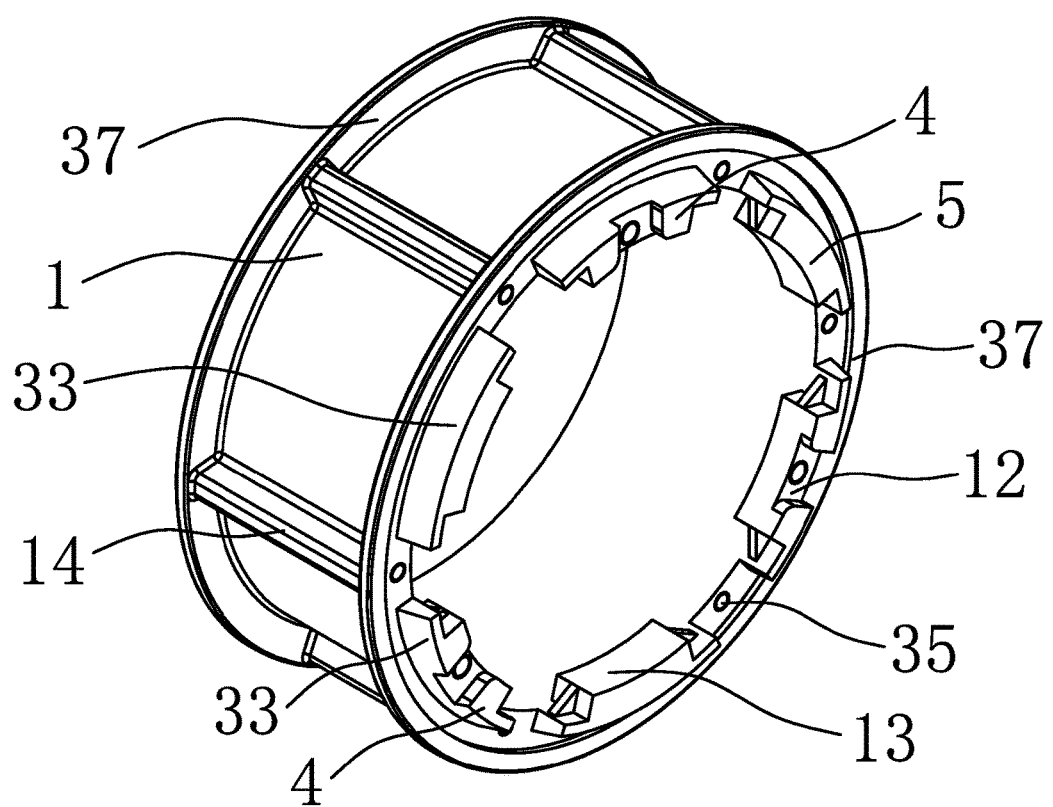
FIG. 4 is a structural diagram of a hub of the present invention.
Figure 5:
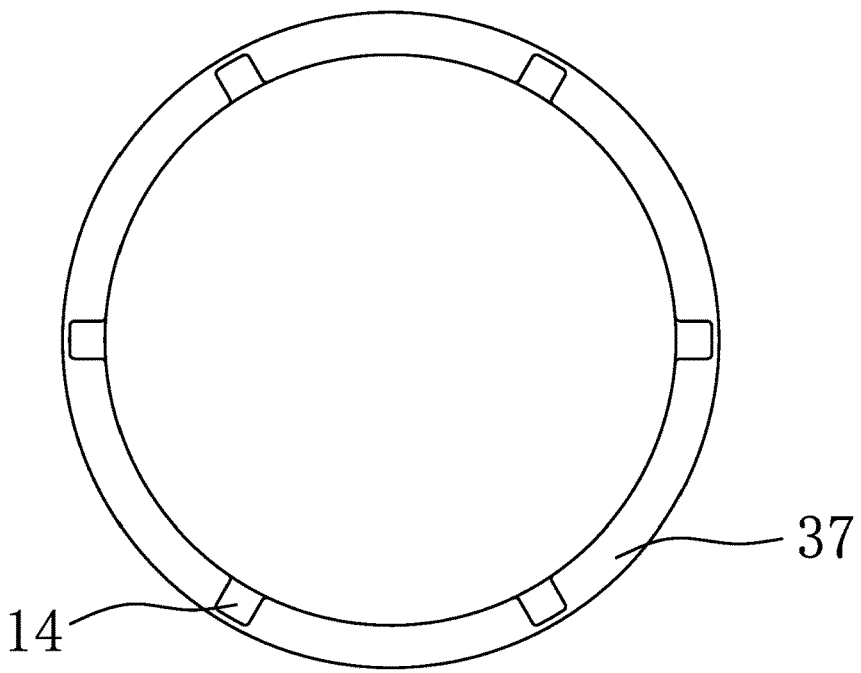
FIG. 5 is a radially sectional view of the hub of the present invention.
Figure 6:
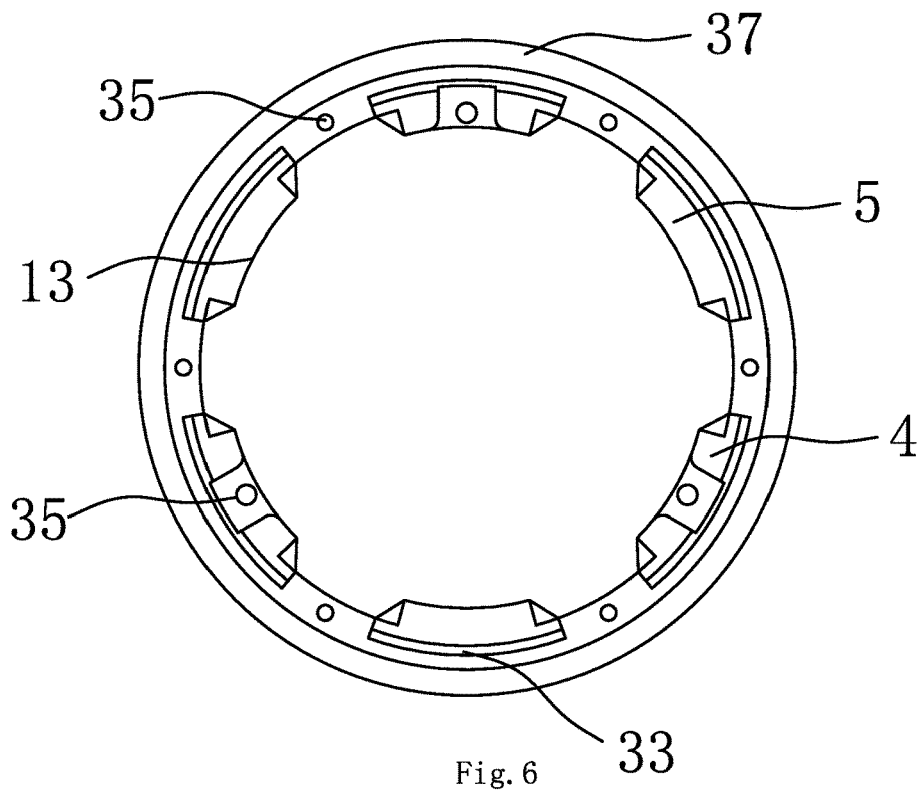
FIG. 6 is another structural diagram of the hub of the present invention.
Figure 7:
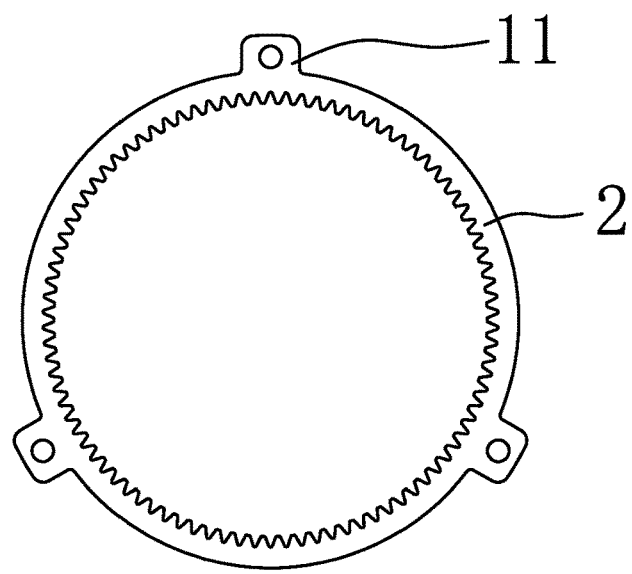
FIG. 7 is a structural diagram of an inner gear ring of the present invention.
Figure 8:
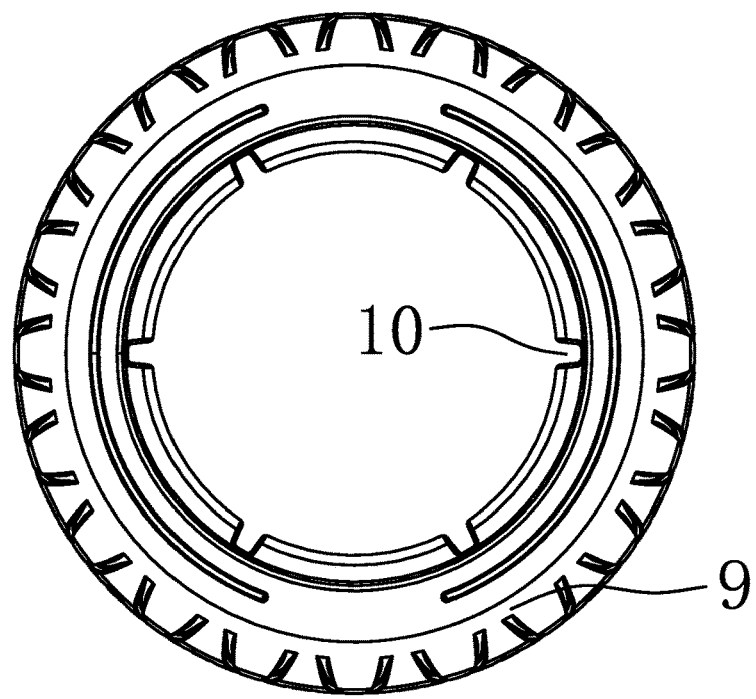
FIG. 8 is a structural diagram of a tire of the present invention.
Figure 9:
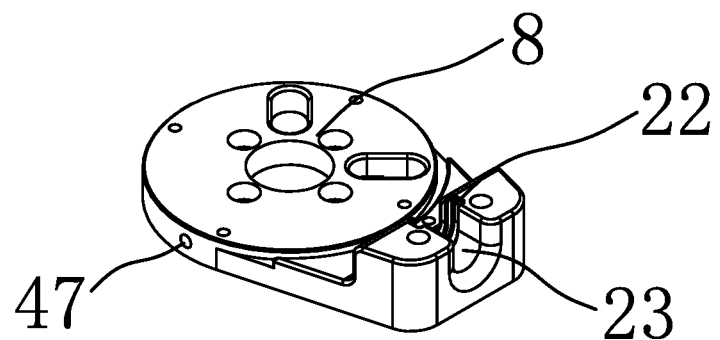
FIG. 9 is a structural diagram of an electric hub mounting plate of the present invention.

As shown in FIGS. 1, 4 and 6, a left hub end cover 31 and a right hub end cover 32 are fitted at left and right ends of the inner wall of the hub 1, respectively. Six first process holes are formed on a left end face of the hub 1, and six second process holes 35 are formed on a right end face of the hub 1. Both the first process holes and the second process holes 35 are arranged annularly at uniform intervals, and each of the second process holes 35 is relatively located between two bosses. The bosses extend outward along an axis of the hub 1. Second chambered surfaces 33 matched with an inner wall of the right hub end cover 32 are formed on the outer walls of the bosses, and the second chambered surfaces are of a slope structure inclined to the inner side. A right end cover bearing chamber is provided on an inner side of the right hub end cover 3, and a first bearing 50 matched with the electric hub mounting shaft 25 is fixed within the right end cover bearing chamber 32.

As shown in FIGS. 1, 2, 3, 9 and 10, the planet speed-reduction mechanism includes a planet carrier 43. The planet carrier 43 is fixed to one end of the electric hub mounting shaft 25, while the other end of the electric hub mounting shaft 25 extends outside the right hub end cover 32. A rear motor end cover 42 and a front motor end cover 41 are fitted at two ends of the housing 7 of the driving motor, respectively. A cylindrical bearing chamber 45 is formed on the rear motor end cover 42. The cylindrical bearing chamber 45 extends outside the left hub end cover 31 and is fixed to the electric hub mounting plate 8. The cylindrical bearing chamber 45 is equipped with a second bearing 51. An inner ring of the second bring is fixed to the cylindrical bearing chamber 45, while an outer ring thereof is fixed to the left hub end cover 31. The planet carrier 43 is fixed to the front motor end cover 41.

An arc-shaped stopper for ensuring the circumferential limiting of the planet carrier 43 is formed on an outer side of the front motor end cover 41. Both the planet gear 3 and the sun gear are fixed on the planet carrier 43 via a pin shaft 44, and the planet gear 3 and the sun gear are located between the planet carrier 43 and the front motor end cover 41.

All the electric hub mounting plate 8, the brake pad 17, the brake block 16 and the brake arm 15 are relatively located between a left end cover 31 and a brake shield 46. Third process holes 47 for mutual fixation are formed on both a side face of the electric hub mounting plate 8 and a side face of the brake shield 46.

Figure 2:
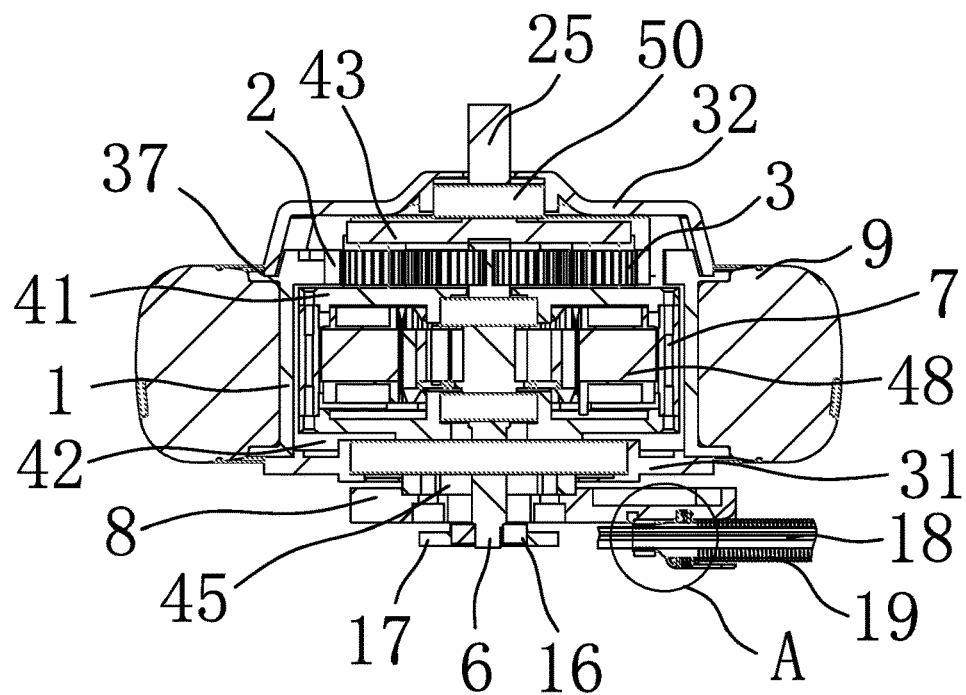
FIG. 2 is a sectional view of the present invention.
Figure 3:
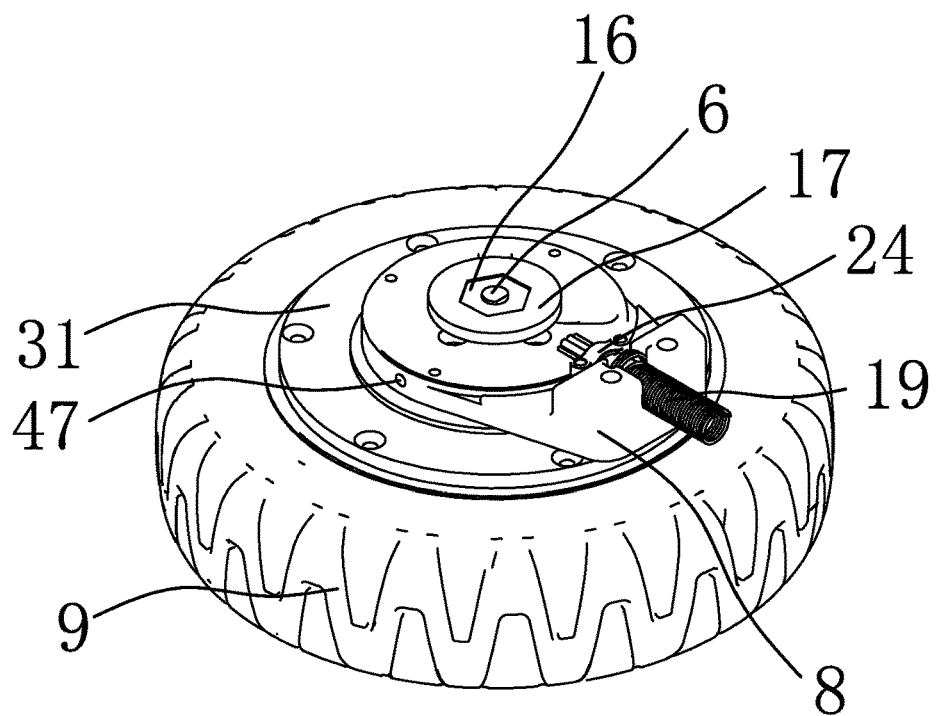
FIG. 3 is a structural diagram of the present invention.

As shown in FIGS. 1, 2 and 3, the electromagnetic brake mechanism includes a brake arm 15, a brake block 16 fixed on the motor shaft 6, and a brake pad 17 which is sheathed outside the brake block 16 and fixed to the brake block 16. The brake block 16 is of a polygonal structure, the brake pad 17 is disc-shaped, and a fitting groove matched with the brake block 16 in shape is formed in the center of the brake pad 17. The brake arm 15 is able to lock the brake pad 17 so as to brake the motor shaft 6.

As shown in FIGS. 1, 2, 3 and 9, an electric hub mounting plate 8 is fixed on an end face of the cylindrical bearing chamber 45 of the rear motor end cover 42. A lead clamp 24 is fixed on the electric hub mounting plate 8, and a first groove section and a second groove section are provided at a position of the electric hub mounting plate 8 corresponding to an outer side of the lead clamp 24. A leading-out wire 18 of the motor is fitted with the lead clamp 24, and a spring sheath 19 is sheathed outside a portion of the leading-out wire located on the outer side of the lead clamp 24. The spring sheath 19 includes a first section 20 and a second section 21. The diameter of the first section 20 is greater than that of the second section 21, and the diameter of the second section 21 is matched with the diameter of the leading-out wire 18. The width of the first groove section 22 is matched with the diameter of the first section 20, and the width of the second groove section 23 is matched with the diameter of the second section 21. The first section of the spring sheath 19 may be clamped within the first groove section 22, and the second section thereof may be clamped within the second groove section 23. The leading-out wire 18 passes through the lead clamp 24 and then successively through the first groove section 22 and the second groove section 23. An end of the spring sheath 19 away from the electric hub mounting plate is fixed to a vehicle frame.

Figure 10:
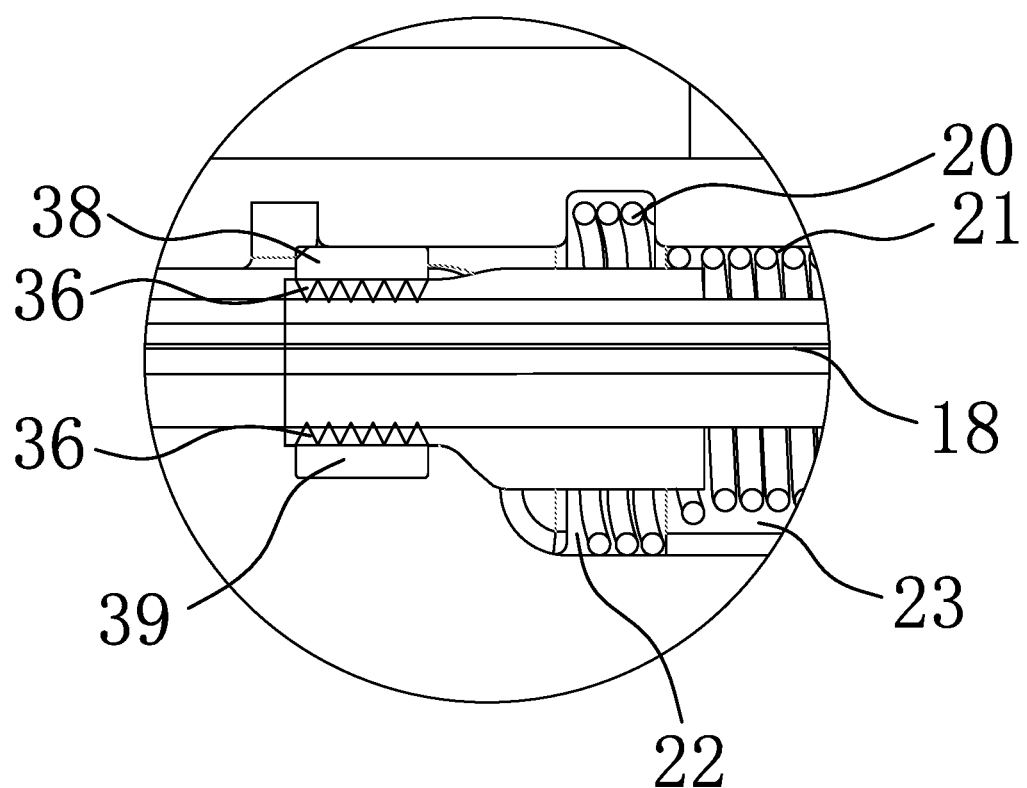
FIG. 10 is an enlarged view of part A of FIG. 2.

As shown in FIGS. 3 and 10, the lead clamp 24 on the electric hub mounting plate 8 includes an upper clamp body 38 and a lower clamp body 39, both of which are of an ohm-type structure. An opening of the upper clamp body and an opening of the lower clamp body are arranged opposite to each other. The upper clamp body and the lower clamp body are fitted to each other and fixed via fasteners. The leading-out wire 18 is fitted between the upper clamp body and the lower clamp body, and meshing teeth 36 are formed inside both the opening of the upper clamp body and the opening of the lower clamp body.

As shown in FIGS. 1, 2, 4, 5 and 8, six ribs 14 protruded outward are formed on the outer wall of the hub 1 of the present invention, and flanges 37 are provided on two opposite sides of the hub 1. The ribs 14 are parallel to the axis of the hub 1, the six ribs 14 are distributed at uniform intervals on the outer wall of the hub 1 in a circumferential direction of the hub 1, and each of the ribs 14 has a rectangular cross-section.

A tire 9 is sheathed outside the hub 1, the tire 9 is located between two flanges 37, and the tire is a solid foam tire. Six fitting grooves 10 in one-to-one correspondence to the ribs 14 are formed on an inner side of the tire 9. The width of each of the fitting grooves 10 gradually increases from the bottom to the opening. The cross-section of each of the fitting grooves 10 is an isosceles trapezoid along the axis of the tire.

In the present invention, the motor shaft of the driving motor drives the sun gear of the planet speed-reduction mechanism to rotate, so as to rotate the planet gear meshed with the sun gear. Since the planet gear is meshed with the inner gear ring, the rotation of the planet gear may drive the inner gear ring; moreover, since the hub is fixed to the inner gear, the rotation of the tire is realized. Since the hub and the inner gear ring in the present invention are separated from each other, the hub and the inner gear ring are unnecessarily made of the same material. It is possible that the inner gear ring is made of steel and the hub is made of aluminum, so that the weight of the hub of the present invention is decreased. The present invention has the advantages of compact structure, decreased weight of the driving wheel and reduced production cost. Furthermore, the present invention can avoid the slipping of the wire relative to the hub, and has better braking performance and higher safety.

The invention claimed is:

1. An electric hub, comprising a hub and an inner gear ring; wherein the inner gear ring and the hub are separated from each other, and the inner gear ring and the hub are fixed coaxially and rotate synchronously; the hub has a hollow inner chamber within which a driving motor is provided; the driving motor comprises a housing and a motor shaft; there is a gap between an outer wall of the housing and an inner wall of the inner chamber of the hub; and, one end of the motor shaft is matched with the inner gear ring via a planet speed-reduction mechanism, while an electromagnetic brake mechanism is provided at the other end of the motor shaft;
wherein a left hub end cover and a right hub end cover are fitted at two ends of the inner chamber of the hub, respectively; the planet speed-reduction mechanism comprises a planet carrier; and, the planet carrier is fixed to one end of an electric hub mounting shaft, while the other end of the electric hub mounting shaft extends outside the right hub end cover; and
wherein, the driving motor comprises a rear motor end cover and a front motor end cover; a cylindrical bearing chamber is formed on the rear motor end cover; the cylindrical bearing chamber extends outside the left hub end cover and is fixed to an electric hub mounting plate; and, the planet carrier is fixed to the front motor end cover.

2. An electric hub, comprising a hub and an inner gear ring; wherein the inner gear ring and the hub are separated from each other, and the inner gear ring and the hub are fixed coaxially and rotate synchronously; the hub has a hollow inner chamber within which a driving motor is provided; the driving motor comprises a housing and a motor shaft there is a gap between an outer wall of the housing and an inner wall of the inner chamber of the hub; and, one end of the motor shaft is matched with the inner gear ring via a planet speed-reduction mechanism, while an electromagnetic brake mechanism is provided at the other end of the motor shaft wherein a number of bosses extending inward are formed on an inner wall of the hub, a number of fixed portions extending outward are formed on an outer edge of the inner gear ring, and fixed portion grooves matched with the fixed portions in shape are formed on the bosses; inner walls of the bosses are first cambered surfaces fitted with the outer edge of the inner gear ring; the fixed portions of the inner gear ring are located within the fixed portion grooves; and, the fixed portions of the inner gear ring are fixed to the hub via fasteners, and the outer edge of the inner gear ring is resisted against the inner walls of the bosses.

3. The electric hub according to claim 2, characterized in that at least three fixed portions extending outward are formed on the outer edge of the inner gear ring, and the fixed portions are arranged annularly at uniform intervals; the bosses comprises first bosses and second bosses, and there are at least three first bosses; the fixed portion grooves are arranged on the first bosses, and the fixed portions are in one-to-one correspondence to the first bosses; the fixed portions of the inner gear ring are fixed to the fixed bosses via fasteners; and, the first chambered surfaces are formed on both the inner walls of the first bosses and the inner walls of the second bosses.

4. An electric hub, comprising a hub and an inner gear ring; wherein the inner gear ring and the hub are separated from each other, and the inner gear ring and the hub are fixed coaxially and rotate synchronously; the hub has a hollow inner chamber within which a driving motor is provided; the driving motor comprises a housing and a motor shaft there is a gap between an outer wall of the housing and an inner wall of the inner chamber of the hub; and, one end of the motor shaft is matched with the inner gear ring via a planet speed-reduction mechanism, while an electromagnetic brake mechanism is provided at the other end of the motor shaft wherein the electromagnetic brake mechanism comprises a brake block located on the motor shaft and a brake pad which is sheathed outside the brake block and fixed with the brake block; the brake block is of a polygonal structure, the brake pad is disc-shaped, and a fitting groove matched with the brake block in shape is formed in the center of the brake pad; and, a brake arm capable of locking the brake pad is provided outside the hub.

5. An electric hub, comprising a hub and an inner gear ring; wherein the inner gear ring and the hub are separated from each other, and the inner gear ring and the hub are fixed coaxially and rotate synchronously; the hub has a hollow inner chamber within which a driving motor is provided; the driving motor comprises a housing and a motor shaft there is a gap between an outer wall of the housing and an inner wall of the inner chamber of the hub; and, one end of the motor shaft is matched with the inner gear ring via a planet speed-reduction mechanism, while an electromagnetic brake mechanism is provided at the other end of the motor shaft wherein a lead clamp is fixed on the electric hub mounting plate; a first groove section and a second groove section are provided at a position on the electric hub mounting plate corresponding to an outer side of the lead clamp; a leading-out wire of the motor is fitted with the lead clamp, and a spring sheath is sheathed outside the leading-out wire; the spring sheath comprises a first section and a second section; the diameter of the first section is greater than that of the second section, and the diameter of the second section is matched with the diameter of the leading-out wire; the first section is fixed within the first groove section, and the second section is fixed within the second groove section; and, the leading-out wire passes through the lead clamp and then successively through the first groove section and the second groove section; and the lead clamp comprises an upper clamp body and a lower clamp body, both of which are of an ohm-type structure; an opening of the upper clamp body and an opening of the lower clamp body are arranged opposite to each other; the leading-out wire is fitted between the upper clamp body and the lower clamp body; and meshing teeth are formed inside both the opening of the upper clamp body and the opening of the lower clamp body.

6. An electric hub, comprising a hub and an inner gear ring; wherein the inner gear ring and the hub are separated from each other, and the inner gear ring and the hub are fixed coaxially and rotate synchronously; the hub has a hollow inner chamber within which a driving motor is provided; the driving motor comprises a housing and a motor shaft there is a gap between an outer wall of the housing and an inner wall of the inner chamber of the hub; and, one end of the motor shaft is matched with the inner gear ring via a planet speed-reduction mechanism, while an electromagnetic brake mechanism is provided at the other end of the motor shaft wherein at least six first process holes are formed at an end of the inner chamber of the hub equipped with the left hub end cover, and at least six second process holes are formed at an end of the inner chamber of the hub equipped with the right hub end cover; both the first process holes and the second process holes are arranged annularly at uniform intervals; and each of the second process holes is relatively located between two bosses; and the bosses extend outward along an axis of the hub; second chambered surfaces matched with an inner wall of the right hub end cover are formed on the outer walls of the bosses, and the second chambered surfaces are of a slope structure inclined to the inner side.

7. An electric hub, comprising a hub and an inner gear ring; wherein the inner gear ring and the hub are separated from each other, and the inner gear ring and the hub are fixed coaxially and rotate synchronously; the hub has a hollow inner chamber within which a driving motor is provided; the driving motor comprises a housing and a motor shaft there is a gap between an outer wall of the housing and an inner wall of the inner chamber of the hub; and, one end of the motor shaft is matched with the inner gear ring via a planet speed-reduction mechanism, while an electromagnetic brake mechanism is provided at the other end of the motor shaft wherein a number of ribs protruded outward are formed on the outer wall of the hub, the ribs are parallel to the axis of the hub, and the number of ribs are distributed at uniform intervals on the outer wall of the hub in a circumferential direction of the hub.

8. The driving wheel according to claim 7, characterized in that a tire is provided outside the hub; a number of fitting grooves in one-to-one correspondence to the ribs are formed on an inner side of the tire; the width of each of the fitting grooves gradually increases from the bottom to the opening; each of the ribs has a square cross-section; and the tire is a solid foam tire.

* * * * *